United States Patent
Högasten et al.

(10) Patent No.: US 9,215,384 B2
(45) Date of Patent: Dec. 15, 2015

(54) METHOD OF PROCESSING AN INFRARED IMAGE, INFRARED IMAGE CAPTURING SYSTEM AND COMPUTER READABLE MEDIUM

(75) Inventors: Nicolas Högasten, Hägersten (SE); Fredrik Andersson, Sollentuna (SE)

(73) Assignee: FLIR Systems AB, Taby (SE)

( * ) Notice: Subject to any disclaimer, the term of this patent is extended or adjusted under 35 U.S.C. 154(b) by 1156 days.

(21) Appl. No.: 12/668,557

(22) PCT Filed: Jul. 9, 2007

(86) PCT No.: PCT/SE2007/000669
§ 371 (c)(1),
(2), (4) Date: Jun. 7, 2010

(87) PCT Pub. No.: WO2009/008778
PCT Pub. Date: Jan. 15, 2009

(65) Prior Publication Data
US 2010/0238294 A1    Sep. 23, 2010

(51) Int. Cl.
| | |
|---|---|
| H04N 5/33 | (2006.01) |
| G06T 5/00 | (2006.01) |
| G06T 5/40 | (2006.01) |
| G06T 5/50 | (2006.01) |
| G06T 7/00 | (2006.01) |
| H04N 5/235 | (2006.01) |
| H04N 5/222 | (2006.01) |

(52) U.S. Cl.
CPC *H04N 5/33* (2013.01); *G06T 5/008* (2013.01); *G06T 5/40* (2013.01); *G06T 5/50* (2013.01); *G06T 7/0079* (2013.01); *G06T 7/0081* (2013.01); *G06T 2207/10048* (2013.01); *G06T 2207/20144* (2013.01); *G06T 2207/20208* (2013.01); *H04N 5/2226* (2013.01); *H04N 5/2355* (2013.01)

(58) Field of Classification Search
CPC .......... G06T 2207/10048; G06T 2207/20144; G06T 4/007
See application file for complete search history.

(56) References Cited

U.S. PATENT DOCUMENTS

| | | | |
|---|---|---|---|
| 4,825,297 A | 4/1989 | Fuchsberger et al. | |
| 5,835,618 A | 11/1998 | Fang et al. | |
| 5,995,656 A * | 11/1999 | Kim | 382/169 |
| 6,359,681 B1 * | 3/2002 | Housand et al. | 356/4.01 |

(Continued)

FOREIGN PATENT DOCUMENTS

| | | |
|---|---|---|
| SE | 0500659 A | 3/2006 |
| WO | WO-2005117414 A1 | 12/2005 |

OTHER PUBLICATIONS

PCT/ISA/210—International Search Report—Apr. 30, 2008.

(Continued)

*Primary Examiner* — Geepy Pe
*Assistant Examiner* — William Adrovel
(74) *Attorney, Agent, or Firm* — Haynes and Boone, LLP (57) ABSTRACT

A system and method for processing an infrared image. The infrared image is processed to provide a background portion of the infrared image and a detail portion of the infrared image. The background portion and/or the detail portion is scaled to provide a level of the detail portion relative to a level of the background portion. The background portion and the detail portion are merged after the scaling to provide a processed infrared image. The processed infrared image is stored.

22 Claims, 7 Drawing Sheets

(56) References Cited

U.S. PATENT DOCUMENTS

| | | | |
|---|---|---|---|
| 2001/0007478 A1 | 7/2001 | Kim | |
| 2004/0057630 A1 | 3/2004 | Schuhrke et al. | |
| 2005/0078121 A1* | 4/2005 | Turner | 345/581 |
| 2006/0188246 A1* | 8/2006 | Terre et al. | 396/275 |
| 2007/0047838 A1* | 3/2007 | Milanfar et al. | 382/289 |
| 2008/0316328 A1* | 12/2008 | Steinberg | G06K 9/036 348/222.1 |

OTHER PUBLICATIONS

PCT/ISA/237—Written Opinion of the International Searching Authority—Apr. 30, 2008.

PCT/IPEA/409—Inernational Preliminary Report on Patentability—Oct. 19, 2009.

European Search Report—Aug. 2, 2013 (Issued in Counterpart Application No. 07748323.8).

* cited by examiner

METHOD OF PROCESSING AN INFRARED IMAGE, INFRARED IMAGE CAPTURING SYSTEM AND COMPUTER READABLE MEDIUM

CROSS-REFERENCE TO RELATED APPLICATIONS

This application is the national phase under 35 U.S.C. §371 of PCT/SE2007/000669 filed 9 Jul. 2007.

TECHNICAL FIELD

The present invention relates generally to infrared imaging systems and, more particularly, to image processing techniques for infrared imaging systems and methods for controlling the display of an infrared image.

BACKGROUND

Infrared cameras are utilized in a variety of imaging applications to capture infrared images. These captured infrared images may be grainy (e.g., noisy) or lack sufficient detail and, therefore to some extent, processing techniques may be applied to suppress unwanted features, such as noise, and/or refine the captured infrared images.

In general, infrared cameras may have to deal with two often contradictory signal characteristics. On the one hand, a digitized infrared image may have a large dynamic range, which may be measured in digital units (e.g., on the order of tens of thousands of digital units). Within this dynamic range, some faint detail might be of great importance to the user and which, in order to be visible to the user on a display, may require for example the application of a contrast enhancement filter. On the other hand, an infrared image may also suffer from poor signal to noise ratio (SNR) and consequently, contrast enhancement might make the image less useful because an enhancement to the contrast may result also in the amplification of the noise. Typically, some kind of noise filter may be applied to the infrared signal, but finding the right settings for the noise filter for a particular imager, for a particular scene, and for a particular application may be time consuming. Therefore, minimizing the user's time for finding the optimal setting, under which some detail or target of choice may best be viewed, may be very beneficial for a number of different types of applications.

A drawback of a conventional infrared camera is that a user is not allowed to control these processing techniques during capture of the image or the optimal settings may be difficult to determine by the user. Consequently, from a user's perspective, the result is a less than desirable image being captured and displayed. Furthermore, automatically setting various parameters may be difficult. For example, for two images with similar signal properties (e.g., SNR, dynamic range, etc.), the fainter details may be essential for classifying a target or may just be clutter that the user would rather suppress than enhance.

As a result, there is a need for improved techniques for providing image processing techniques and/or user-controllable settings for infrared cameras.

SUMMARY

Systems and methods disclosed herein, in accordance with one or more embodiments of the present invention, provide image processing techniques for images captured by infrared sensors (e.g., infrared cameras) that may improve image quality. For example, in accordance with an embodiment of the present invention, image processing algorithms are disclosed to separate an image signal into at least two parts, which may be separately scaled before merging of the two parts to produce an output image. Furthermore, in accordance with an embodiment of the present invention, two matched tables of values may be generated for the image processing algorithms for continuous transitioning from an image with a low level of detail to an image with a high level of detail and vice versa. Consequently, for example, a user may operate a control feature (e.g., a control device) to adjust the image processing algorithms to control and set details of an image to a desirable level.

More specifically, in accordance with an embodiment of the present invention, a method of processing an infrared image includes processing the infrared image to provide a background portion of the infrared image and a detail portion of the infrared image; scaling the background portion and/or the detail portion to provide a level of the detail portion relative to a level of the background portion; merging the background portion and the detail portion after the scaling to provide a processed infrared image; and storing the processed infrared image.

In accordance with another embodiment of the present invention, an infrared image capturing system includes an image capture component adapted to capture an infrared image; a processing component; and a memory component adapted to store information to control the processing component to perform infrared image processing. The infrared image processing includes filtering the infrared image to provide a background portion of the infrared image and a detail portion of the infrared image; scaling the background portion and/or the detail portion to provide a level of the detail portion relative to a level of the background portion; merging the background portion and the detail portion after the scaling to provide a processed infrared image; and storing the processed infrared image.

In accordance with another embodiment of the present invention, a computer-readable medium on which is stored information for performing a method, the method includes filtering an infrared image to provide a background portion of the infrared image and a detail portion of the infrared image; scaling the background portion and/or the detail portion to provide a level of the detail portion relative to a level of the background portion; performing histogram equalization to the background portion; merging the background portion and the detail portion after the scaling to provide a processed infrared image; and storing the processed infrared image.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Systems and methods are disclosed herein, in accordance with one or more embodiments of the present invention, to provide image processing algorithms for images captured by infrared imaging systems, which may improve image detail and quality by allowing a user to selectively scale (e.g., enhance and/or diminish) one or more parts of the captured infrared image to a desired level. For example, in accordance with an embodiment of the present invention, an image signal provided by an infrared camera may be separated into a background image (e.g., a low spatial frequency, high amplitude portion of the image signal) and a detail image (e.g., a high spatial frequency, low amplitude portion of the image signal). The background image and/or the detail image, for example, may then be scaled separately before they are merged to produce an output image or stored for later display. As disclosed further herein, one or more embodiments of the present invention may provide certain advantages over conventional infrared imaging systems (e.g., infrared cameras), such as for example, by providing one or more user controls that may reduce the complexity of choosing infrared camera settings for the image processing algorithms (e.g., an optimal set of parameters for a particular type of scene, such as a low light scene having high frequency noise that decreases overall image quality).

Figure 1:
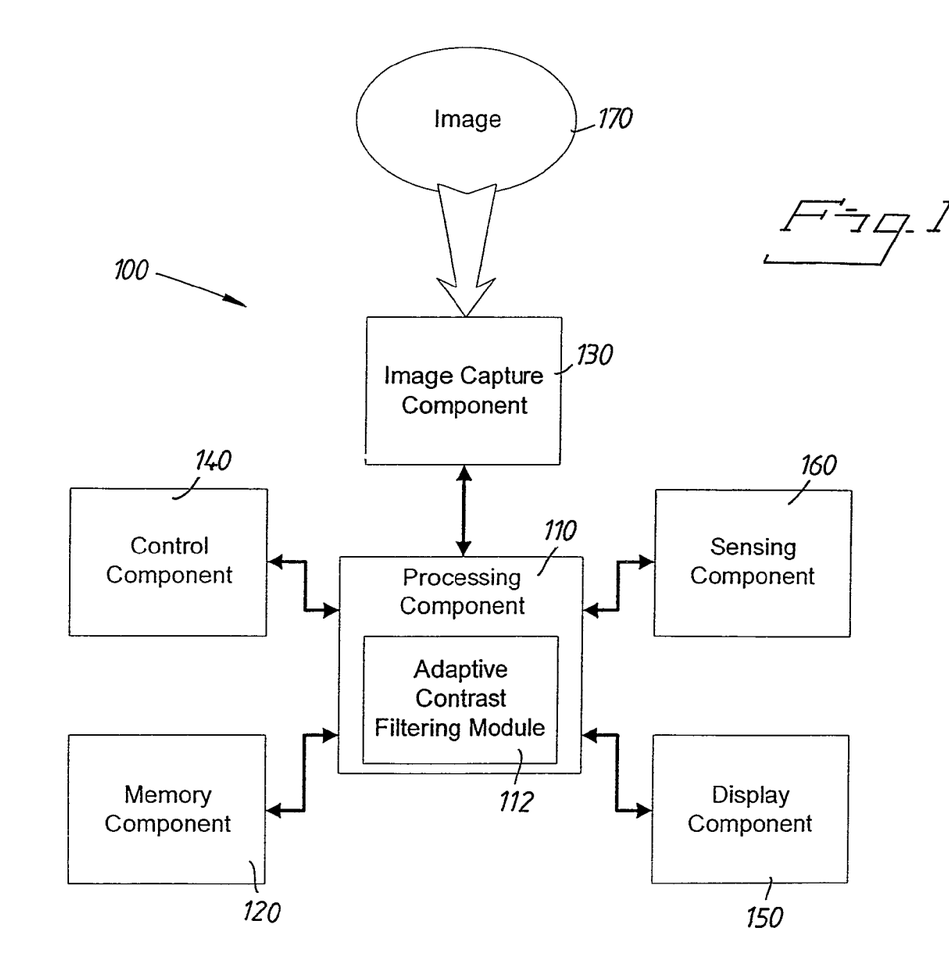
FIG. 1 shows a block diagram of an image capturing system in accordance with an embodiment of the present invention.

In accordance with an embodiment of the present invention, FIG. 1 shows a block diagram illustrating an image capturing system 100 for capturing and processing infrared images. Image capturing system 100 comprises, in one embodiment, a processing component 110, a memory component 120, an image capture component 130, a control component 140, a display component 150, and optionally a sensing component 160.

Image capturing system 100 may represent an infrared imaging device, such as an infrared camera, to capture images, such as an image 170. Image capturing system 100 may represent any type of infrared camera, which for example detects infrared radiation and provides representative data (e.g., one or more snapshots or video infrared images). For example, image capturing system 100 may represent an infrared camera that is directed to the near, middle, and/or far infrared spectrums. Image capturing system 100 may comprise a portable device and may be incorporated, for example, into a vehicle (e.g., an automobile or other type of land-based vehicle, an aircraft, or a spacecraft) or a non-mobile installation requiring infrared images to be stored and/or displayed.

Processing component 110 comprises, in one embodiment, a microprocessor, a single-core processor, a multi-core processor, a microcontroller, a logic device (e.g., a programmable logic device configured to perform processing functions), a digital signal processing (DSP) device etc. Processing component 110 is adapted to interface and communicate with components 120, 130, 140, and 150 to thereby perform method and processing steps in a manner as described herein. Processing component 110 may further comprise a Adaptive Contrast (AC) filtering module 112 that is adapted to implement a AC algorithm (e.g., a AC filtering algorithm), which will be described in greater detail herein. Processing component 110 may also be adapted to perform various other types of image processing algorithms including scaling the signal of one or more parts of the image, either as part of or separate from the AC algorithm, in a manner as will be described herein.

It should be appreciated that AC filtering module 112 may be integrated in software and/or hardware as part of processing component 110, or code (e.g., software or configuration data) for the AC filtering module 112 may be stored in memory component 120. Moreover, for example, in accordance with an embodiment of the present invention, embodiments of the AC algorithm disclosed herein may be stored by a separate computer-readable medium (e.g., a memory such as a hard drive, a compact disk, a digital video disk, or a flash memory) to be executed by a computer (e.g., a logic or processor-based system) to perform various methods disclosed herein. As an example, the computer-readable medium may be portable and/or located separate from image capturing system 100, with the stored AC algorithm provided to image capturing system 100 by coupling the computer-readable medium to image capturing system 100 and/or by image capturing system 100 downloading (e.g., via a wired or wireless link) the AC algorithm from the computer-readable medium.

Memory component 120 comprises, in one embodiment, one or more memory devices to store data and information. The memory device may comprise one or more various types of memory devices including volatile and non-volatile memory devices, such as RAM (Random Access Memory), ROM (Read-Only Memory), EEPROM (Electrically-Erasable Read-Only Memory), flash memory, etc. Processing component 110 is adapted to execute software stored in memory component 120 so as to perform method and process operations described herein.

Image capture component 130 comprises, in one embodiment, one or more infrared sensors (e.g., any type of infrared detector, such as a focal plane array) for capturing infrared image signals representative of an image, such as image 170. In one example, the infrared sensors of image capture component 130 provide for representing (e.g., converting) the captured image signal as digital data (e.g., via an analog-to-digital converter included as part of the infrared sensor or separate from the infrared sensor as part of image capturing system 100). Processing component 110 may be adapted to process the infrared image signals (e.g., to provide processed image data), store the infrared image signals or image data in memory component 120, and/or retrieve stored infrared image signals from memory component 120. For example, processing component 110 may be adapted to process infrared image signals stored in memory component 120 to provide image data (e.g., captured and/or processed infrared image data).

Control component 140 comprises, in one embodiment, a user input device, such as a rotatable knob (e.g., potentiometer), push buttons, slide bar, keyboard, etc., that is adapted to generate an input control signal. Processing component 110 may be adapted to sense control input signals from control component 140 and respond to any sensed control input signals received therefrom. Processing component 110 may be adapted to interpret the control input signal as a value, which will be discussed in greater detail herein.

Figure 5:
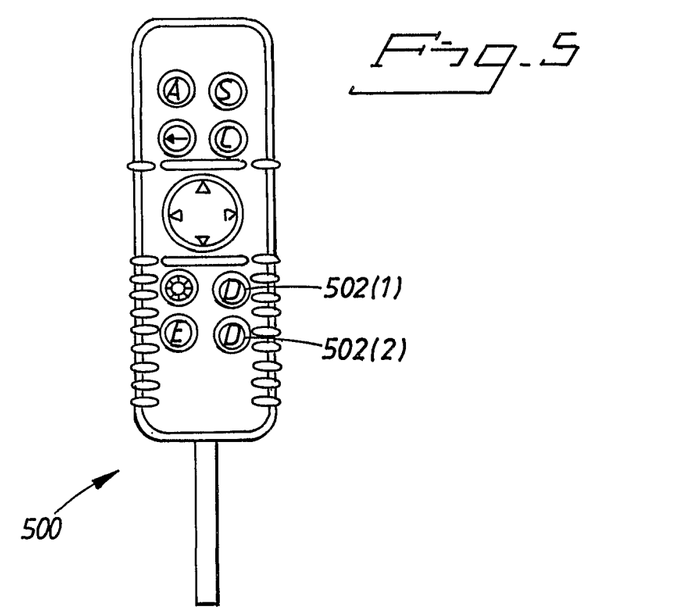
FIG. 5 shows a front view of a hand control unit in accordance with an embodiment of the present invention.

In one embodiment, control component 140 may comprise a generally known control unit 500 (e.g., a wired or wireless handheld control unit) having push buttons adapted to interface with a user and receive user input control values, as shown in FIG. 5. For example, the push buttons of control unit 500 may be used to control various functions of image capturing system 100, such as autofocus, menu enable and selection, field of view, brightness, contrast, and/or various other features as would be understood by one skilled in the art. Furthermore in accordance with an embodiment, one or more of these push buttons may be used to input values (e.g., a AC value) for the AC algorithm. For example, push buttons 502(1) and 502(2), which may be used to adjust contrast in one mode of image capturing system 100, may be also used to adjust the AC value (e.g., increase or decrease the setting for the AC value) in another mode of image capturing system 100 as discussed further herein.

Display component 150 comprises, in one embodiment, an image display device (e.g., a liquid crystal display (LCD)) or various other types of generally known video displays or monitors. Processing component 110 may be adapted to display image data and information on display component 150. Processing component 110 may also be adapted to retrieve image data and information from memory component 120 and display any retrieved image data and information on display component 150. Display component 150 may comprise display electronics, which may be utilized by processing component 110 to display image data and information (e.g., infrared images). Display component 150 may receive image data and information directly from image capture component 130 via processing component 110, or the image data and information may be transferred from memory component 120 via processing component 110.

Optional sensing component 160 comprises, in one embodiment, one or more various types of sensors, depending upon the desired application or implementation requirements, which provide information to processing component 110. Processing component 110 may be adapted to communicate with sensing component 160 (e.g., by receiving sensor information from sensing component 160) and with image capture component 130 (e.g., by receiving data from image capture component 130 and providing and/or receiving command, control or other information to and/or from other components of image capturing system 100).

In various embodiments, sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel, a covered parking garage, or other type of enclosure has been entered or exited. Sensing component 160 may represent conventional sensors as would be known by one skilled in the art for monitoring various conditions (e.g., environmental conditions) that may have an affect (e.g., on the image appearance) on the data provided by image capture component 130.

In some embodiments, optional sensing component 160 may comprise devices that relay information to processing component 110 via wireless communication. For example, sensing component 160 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of image capturing system 100 may be combined and/or implemented or not, as desired or depending upon the application or requirements, with image capturing system 100 representing various functional blocks of a system. For example, processing component 110 may be combined with memory component 120, image capture component 130, display component 150 and/or sensing component 160. In another example, processing component 110 may be combined with image capture component 130 with only certain functions of processing component 110 performed by circuitry (e.g., a processor, a microprocessor, a logic device, a microcontroller, etc.) within image capture component 130.

Figure 2:
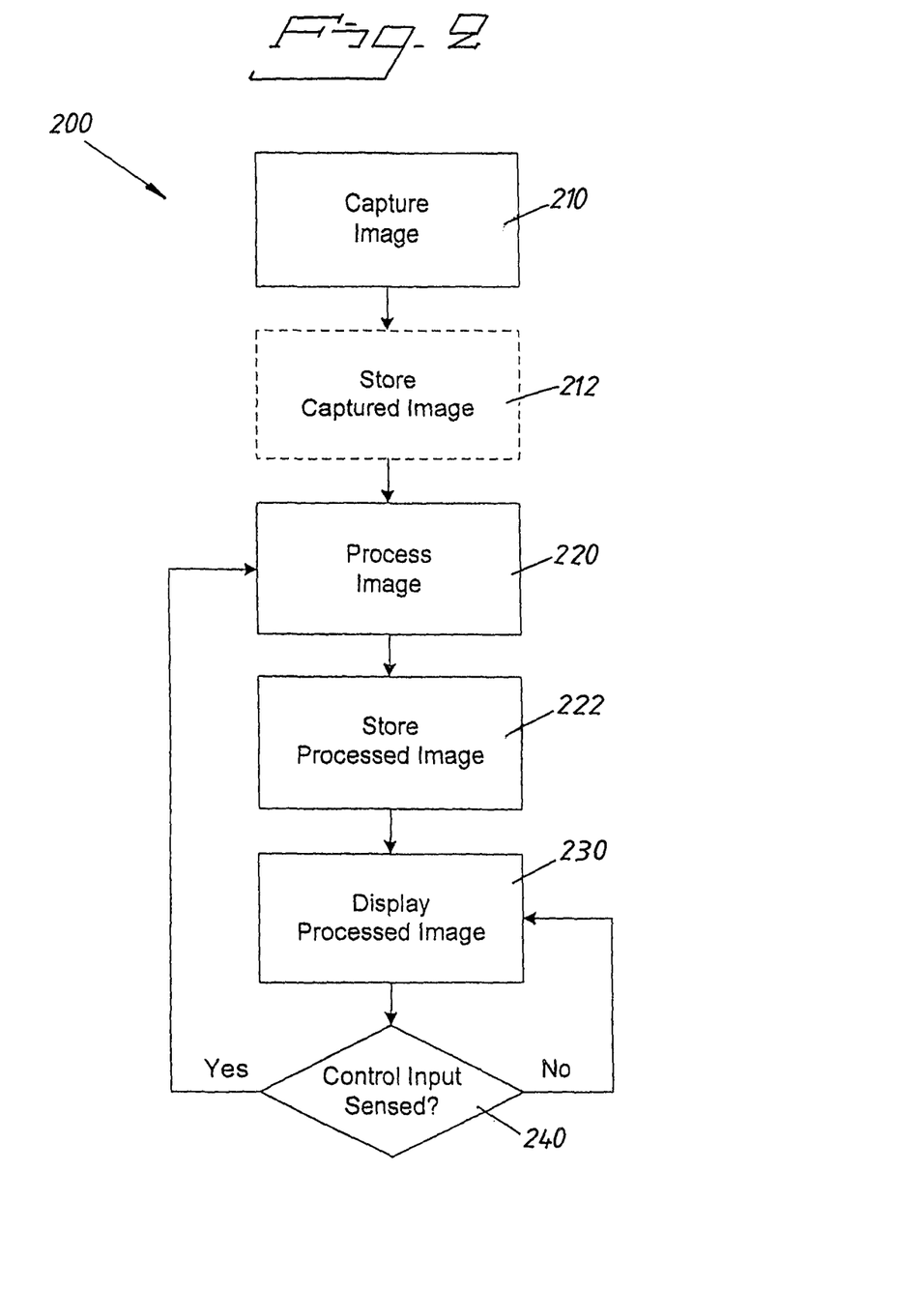
FIG. 2 shows a method for improving image quality in accordance with an embodiment of the present invention.

In accordance with an embodiment of the present invention, FIG. 2 shows a method 200 that may improve image quality and/or detail by allowing a user to selectively process (e.g., enhance and/or diminish) one or more parts of the captured infrared image to a desired level. For purposes of simplifying the following discussion of FIG. 2, reference will be made to image capturing system 100 of FIG. 1 as an example of a system that may perform method 200.

Referring to FIG. 2, an image (e.g., infrared image signal) is captured (block 210). In one embodiment, upon user input command, processing component 110 induces (e.g., causes) image capture component 130 to capture image 170. Processing component 110 receives the captured image from image capture component 130 and optionally stores (block 212) the captured image in memory component 120 for processing.

The image is processed (block 220), wherein the processing may comprise adjusting (e.g., improving) image quality and detail. In one embodiment, processing component 110 either directly processes the image captured (block 210) or optionally retrieves the captured image stored in memory component 120 (block 212) and then processes the image for improved detail and quality (e.g., based on user input via control component 140) in a manner as will be discussed in greater detail herein.

The processed image is stored (block 222) and may be displayed (block 230). In one embodiment, processing component 110 stores the processed image in memory component 120 for displaying and/or processing component 110 retrieves the processed image stored in memory component 120 and displays the processed image on display component 150 for viewing by a user.

A determination may be optionally made (block 240) as to whether a control input from a user is sensed. In one embodiment, if processing component 110 senses a control input from a user via control component 140, then processing component 110 obtains the sensed input value from the control component 140, and the method returns to block 220 so that processing component 110 can process (e.g., re-process) the image in reference to the obtained sensed input control value (e.g., AC value). Otherwise, if processing component 110 does not sense a control input from the user via control component 140, then the method returns to step 230 so that processing component 110 can continue to display the previously processed image. These features will be discussed in greater detail herein.

In accordance with an embodiment of the present invention, an image processing algorithm is adapted to separate an infrared image signal (e.g., captured infrared image) into at least two parts. This image processing algorithm is referred to herein as a Adaptive Contrast (AC) algorithm (or AC filtering algorithm), which for example may be utilized as a filter for filtering portions (e.g., detail image and/or background image) of an infrared image to provide at least a first part and a second part.

In one embodiment, a first part of the image signal includes a background image part comprising a low spatial frequency high amplitude portion of an image. In one simplified example, a low pass filter (e.g., low pass filter algorithm) may be utilized to isolate the low spatial frequency high amplitude portion of the image signal (e.g., infrared image signal).

In one embodiment, a second part of the image signal includes a detailed image part comprising a high spatial frequency low amplitude portion of an image. In one simplified example, a high pass filter (e.g., high pass filter algorithm) may be utilized to isolate the high spatial frequency low amplitude portion of the image signal (e.g., infrared image signal). Alternatively, the second part may be derived from the image signal and the first part of the image signal, such as by subtracting the first part from the image signal.

In one embodiment, the two parts (e.g., first and second parts) of the image signal may be separately scaled with, for example, the AC algorithm before merging to produce an output image. For example, the first part may be scaled or the second part may be scaled or both the first and second parts may be scaled. This allows the system to output an image where fine details are visible and tunable even in a high dynamic range scene. The AC filter algorithm performance may be controlled by a user via a number of parameters, which will be discussed in greater detail herein, to determine for example an optimal set of parameters. In some instances as an example, if an image appears less useful or degraded by some degree due to noise, then one of the parts of the image, such as the detailed part, may be suppressed rather than amplified to suppress the noise in the merged image to improve image quality.

In accordance with an embodiment of the present invention, the AC algorithm may be controlled by the following five variables.

Variable 1 (N) represents a kernel size of a non-linear low pass filter adapted to separate the detailed image part and the background image part. In the case for non-square kernels, a variable of M×N may be used instead, where M and N are different values.

Variable 2 ($\sigma_R$) represents a standard deviation of the radiometric Gaussian, which defines an amplitude of the detailed image portion (or part).

Variable 3 ($\sigma_S$) represents a standard deviation of the spatial Gaussian, which defines a spatial reach of the non-linear low pass filter within the kernel size N (or M×N).

Variable 4 ($D_{Range}$) represents a dynamic range of the detailed image part of the signal in the output image (e.g., merged image).

Variable 5 ($B_{Range}$) represents a dynamic range of the background image part of the signal in the output image (e.g., merged image).

In some systems in accordance with an embodiment, variables N and $\sigma_S$ may be held constant. Accordingly, in a fixed available output range (e.g., 8-bits or 256 colors of a greyscale), $D_{Range}$ may comprise a function of $B_{Range}$ as set forth below in equation (1). Thus, in this embodiment, two parameters may be controlled: $\sigma_R$ and the ratio of $D_{Range}$ over $B_{Range}$, where the ratio may be referred to as the detailed image part to the background image part (e.g., Detail to Background Ratio or D2BR) as set forth below in equation (2).

$$D_{Range} = 256 - B_{Range} \quad (1)$$

$$D2BR = D_{Range}/B_{Range} \quad (2)$$

It should be appreciated that the manner in which these parameters are set will generally change the appearance of the image, and various settings of these parameters may be applied for different scene types.

In accordance with an embodiment of the present invention, the variable $\sigma_R$ comprises a threshold. For example, when a low pass filter (LPF) is applied to a pixel of an image, the filtered value comprises a weighted mean of its neighboring pixels within a spatial range (e.g., 9 by 9 pixels). In one example, a particular low pass filter that may be used to define the variable $\sigma_R$ as a threshold comprises the generally known Bilateral Filter. Neighboring pixels having a value that significantly differs, from the pixel being filtered by more digital units than the variable $\sigma_R$ threshold, may not be used in the averaging, such as by being given a weight of zero or close to zero for the averaging (e.g., the result of which may be to inhibit the low pass filter from blurring across edges of the captured image).

In accordance with an embodiment of the present invention, D2BR (Detail to Background Ratio) comprises a ratio as set forth herein in equation (2). Depending on the type of low pass filter used and settings thereof, the dynamic range of the detailed part of the image may be measured (e.g., defined). In one example, the actual dynamic range may be measured, or when using the Bilateral filter, the maximum range may be proportional to the variable $\sigma_R$. Given a dynamic range of the details (e.g., the second part or detailed image portion), referred to herein as Detail Dynamic Range (DDR), the gain that needs to be applied to the background from the D2BR setting may be calculated.

For example, given a dynamic range of the background (e.g., the first part or background portion), referred to herein as Background Dynamic Range (BDR), a Background Gain (BG) may be set to obtain a desired ratio between details and background as set forth below in equation (3). Alternatively, an inverse of BG, such as 1/BG, may be applied in a similar fashion to the details (e.g., the second part or detailed image portion) to achieve a similar result and provide the desired ratio between details and background. Therefore, in one embodiment, the variable $\sigma_R$ may be adapted to control the background image composition and the detailed image composition, while D2BR may be used to calculate the gain that needs to be applied to the background (or to the detail portion) to obtain the desired ratio of details and background. To maintain smooth transition from image smoothing to detail enhancement the tables are created in such a way that less and less smoothing is applied until a set of parameters are reached (position 20 on the X-axis in FIG. 4a) where the background image will contain the original image (possibly histogram equalized but not smoothed). The AC filter is designed so that for any positive value of D2BR the effective gain of the details in the final filtered image is at least unity (1×). This is to prevent the filter from smoothing the image in the detail enhancement protion of the AC range (20-100% in FIG. 4a). This requirement is fulfilled by forcing the Detail Scale Factor (622) to be ≥the Background Scale Factor (618) in (see FIG. 6).

$$DDR/(BDR*BG) = D2BR, \text{ thus } BG = DDR/(BDR*D2BR) \quad (3)$$

In accordance with an embodiment of the present invention, by creating two matched tables of values for the variable $\sigma_R$ and D2BR corresponding to the AC value, the user may tune the AC filter (e.g., AC filtering algorithm) using one control device, such as a knob (e.g., a potentiometer) or other user-operated selection control. As an example, parameters may be chosen in a specific manner so as to allow a user to continuously transition from an image with a low degree of detail (e.g., filtered detail) to an image with a high degree of detail.

Specifically, in one embodiment, the AC filter may be viewed as operating as a powerful edge preserving noise filter at one end of the tuning range and as a strong detail enhancing filter at the other end of the tuning range. The transition between these two tuning end points may be achieved in increments (e.g., steps), and the transition may be perceived by the user as continuously moving smoothly from a state of less AC to a state of more AC (e.g., gradually increasing the finer details in the scene of the image). Consequently, the techniques disclosed herein may allow for a simpler operation of the infrared imaging system (e.g., infrared camera), for example, with the AC filter set in a manner that is optimal for the particular image during capture.

In one implementation of the AC filtering algorithm, a standard hand control device (e.g., such as shown in FIG. 5) having user input control features serves as a manual control device for manipulating (e.g., variably controlling) the AC filter. The amount of the AC value may be controlled by one or more control features, such as a rotatable knob, push buttons, a slide bar, etc. In one embodiment, AC control of the image (e.g., infrared image) may also allow for some degree of contrast control of the image. In general, rather than a user having to determine and set a number of complex parameters, the AC algorithm may allow a simplified user control (e.g., interface) of these various parameters to obtain the desired image.

As discussed herein, the AC filtering algorithm is adapted to separate the image (e.g., captured infrared image signal) into at least two parts: the background image part and the detailed image part. For example, a non-linear low pass filter (e.g., a Bilateral filter), with the variable $\sigma_R$, may be used to separate the image into the two parts, but this is not limiting. As an example in accordance with an embodiment of the present invention, the captured image may be separated into its detailed and background parts (e.g., components) with frequency decomposition, which may be performed by utilizing, for example, a Fast Fourier Transform (FFT). In one aspect, frequency decomposition comprises transforming the image from a spatial domain (e.g., time domain) to a frequency domain. Details of the image (e.g., detailed image part) may be defined as components above a specific frequency component (e.g., corresponding to the variable $\sigma_R$ threshold and which may be varied similar to a radiometric coefficient). Details of the image (e.g., detailed image part) may be removed (e.g., separated) from the original transform, such as the FFT, which leaves the components for the background information of the image. The background and detail components may be scaled (e.g., before or after an inverse transform is applied). Frequency inversion may be performed to transform scaled background and detail components from the frequency domain back to the spatial domain (e.g., time domain) by utilizing, for example, an Inverse Fast Fourier Transform (IFFT). The scaled background and detail components may then be merged (e.g., added) to form an output image.

Furthermore as another example in accordance with another embodiment of the present invention, the image (e.g., captured infrared image signal) may be separated into its detailed and background image parts (e.g., components) with wavelet decomposition. The wavelet decomposition may be performed in a similar fashion as discussed above for frequency decomposition, but with the use of wavelet transforms instead of frequency transforms (e.g., wavelet domain rather than frequency domain).

Additionally as another example in accordance with another embodiment of the present invention, spatial low pass filters may be utilized, including linear or non-linear low pass filters. Also, non-linear edge preserving smoothing methods may be included (e.g., anisotropic diffusion or variants of median filters). A low pass filter may be applied to the image signal, for example, to separate the low spatial frequency component from the image signal, wherein the low spatial frequency component comprises the background component (e.g., background image part) of the image. It should be appreciated that a parameter (e.g., a standard deviation for a Gaussian low pass filter) that defines the amount of smoothing may be determined and varied similar to the radiometric coefficient (the variable $\sigma_R$ threshold). The detailed component (e.g., detailed image part) of the image may be obtained by subtracting the low pass image component from the original image signal to obtain the details of the image (the detailed component). The detailed component and the background component may then be scaled as discussed herein and merged (e.g., added) to form an output image.

Figure 3:
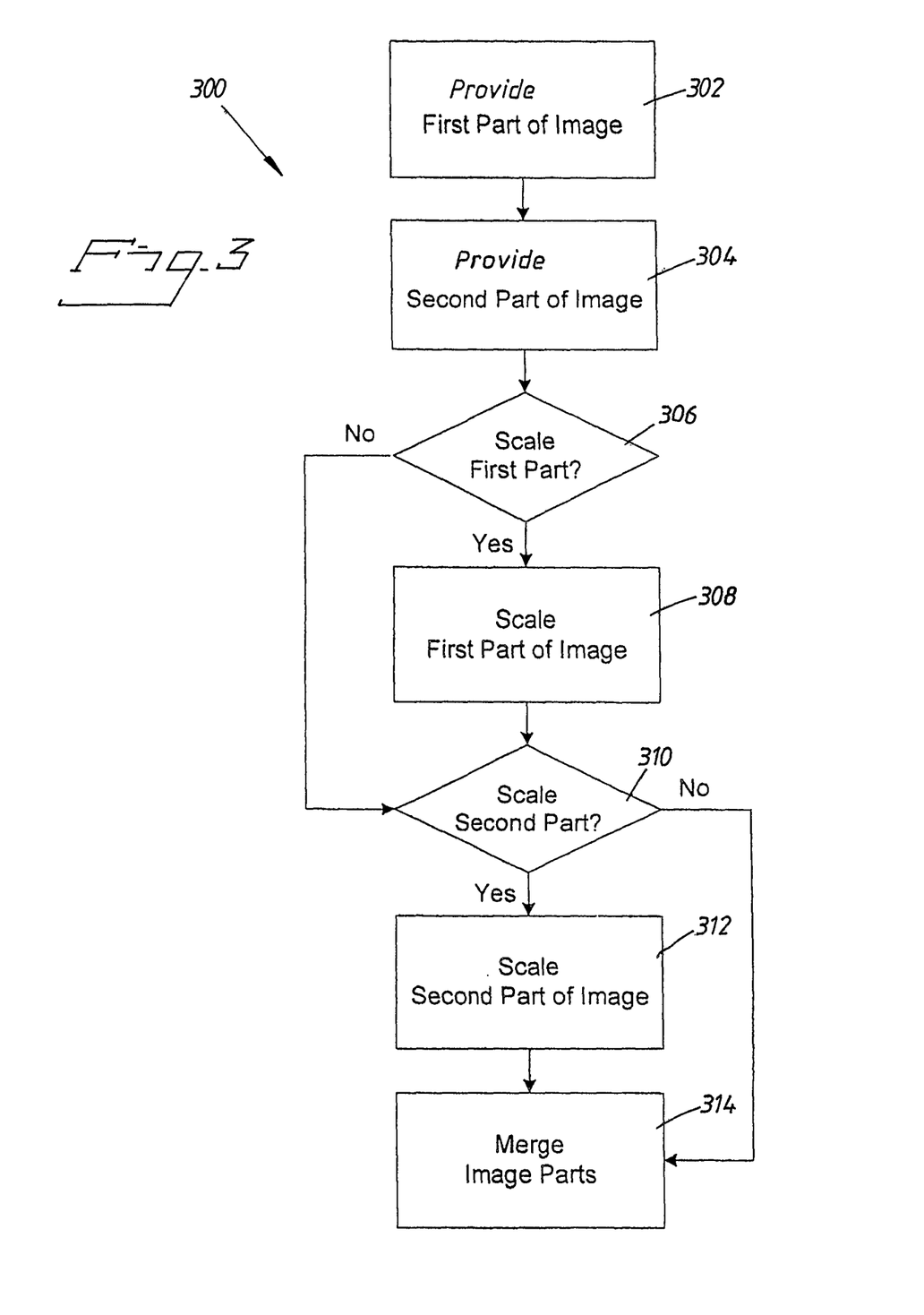
FIG. 3 shows a block diagram of a method for processing an image in accordance with an embodiment of the present invention.

In accordance with an embodiment of the present invention, FIG. 3 shows a method 300 for processing an image in reference to block 220 of FIG. 2. The first part (e.g., background image part) of the captured image is provided (block 302). As previously discussed, the first part of the image (e.g., infrared image) comprises the background image part of the image, which may comprise the low spatial frequency high amplitude portion of the image resulting from application of the AC filtering algorithm. The second part (e.g., detailed image part) of the captured image is provided (block 304). As previously discussed, the second part of the image (e.g., infrared image) comprises the detailed image part of the image, which may comprise the high spatial frequency low amplitude portion of the image resulting from application of the AC filtering algorithm. The parameter D2BR (Detail to Background Ratio) defines the ratio of the detailed image part to the background image part. This parameter may be applied to tune the image in a manner for continuously transitioning between an image with a low degree of detail to an image with a high degree of detail and/or vice versa.

Therefore, a determination may be made (block 306) as to whether to scale (block 308) the first part (e.g., background image part) of the captured image based on the D2BR value (e.g., processing component 110 determines whether to scale the first part of the image based on the corresponding AC value provided by the user control input from control component 140). If user control input is not sensed (e.g., AC value not provided) or the first part is not to be scaled, then the first part of the image is not scaled and method 300 proceeds to block 310.

A determination may be made (block 310) as to whether to scale (block 312) the second part (e.g., detailed image part) of the captured image based on the D2BR value (e.g., processing component 110 determines whether to scale the second part of the image based on the corresponding AC value provided by the user control input from control component 140). If user control input is not sensed (e.g., AC value not provided) or the second part is not to be scaled, then the second part of the image is not scaled and method 300 proceeds to block 314.

The first and second image parts may be merged (block 314) to produce an output image for display. As previously discussed, the first and second parts of the infrared image signal may be separately scaled before merging to produce an output image for viewing by a user. This allows the imaging system to display an infrared image where fine details are visible and tunable for improved image quality.

In accordance with an embodiment of the present invention, a table of AC values along with corresponding values for the variable $\sigma_R$ and the parameter D2BR may be generated for use by the AC algorithm. For example, a user may input a desired AC value (e.g., by increasing or decreasing the AC value via hand control unit 500 while viewing the displayed image), with this provided AC value used to select the corresponding values from the table for the variable $\sigma_R$ and the parameter D2BR.

As a specific example, processing component 110 may receive the AC value selected by the user and look up the corresponding values for the variable $\sigma_R$ and the parameter D2BR (e.g., stored in memory component 120) to use to process the image data with the AC filtering algorithm as discussed herein. Thus, parameter values for the variable $\sigma_R$ and the parameter D2BR may be generated and stored in a table along with a corresponding range of values for the AC value to tune the image, and these parameter values may be chosen for example in a manner for continuous transitioning between an image with a low degree of detail to an image with a high degree of detail and/or vice versa.

In general, the AC filtering algorithm may be disabled by the user (e.g., switch off or deselect the AC filtering mode) or the user may select a desired AC value (e.g., while viewing the displayed image) to provide a desired image quality for the particular image. For example, a low AC value (e.g., a AC value of 1 on a 1 to 100 scale) may result in the AC filtering algorithm functioning as an edge preserving spatial noise filter that produces a smooth image with noise and fine details removed or substantially diminished. As another example, a mid-range AC value (e.g., a AC value of 70 on a 1 to 100 scale) may represent a typical setting for many scenes and may result in the AC filtering algorithm providing a substantial amount of the detail of the image. As another example, a high AC value (e.g., a AC value of 100 on a 1 to 100 scale) may result in the AC filtering algorithm functioning as an extreme detail booster (e.g., detail enhancer).

Figure 4A:
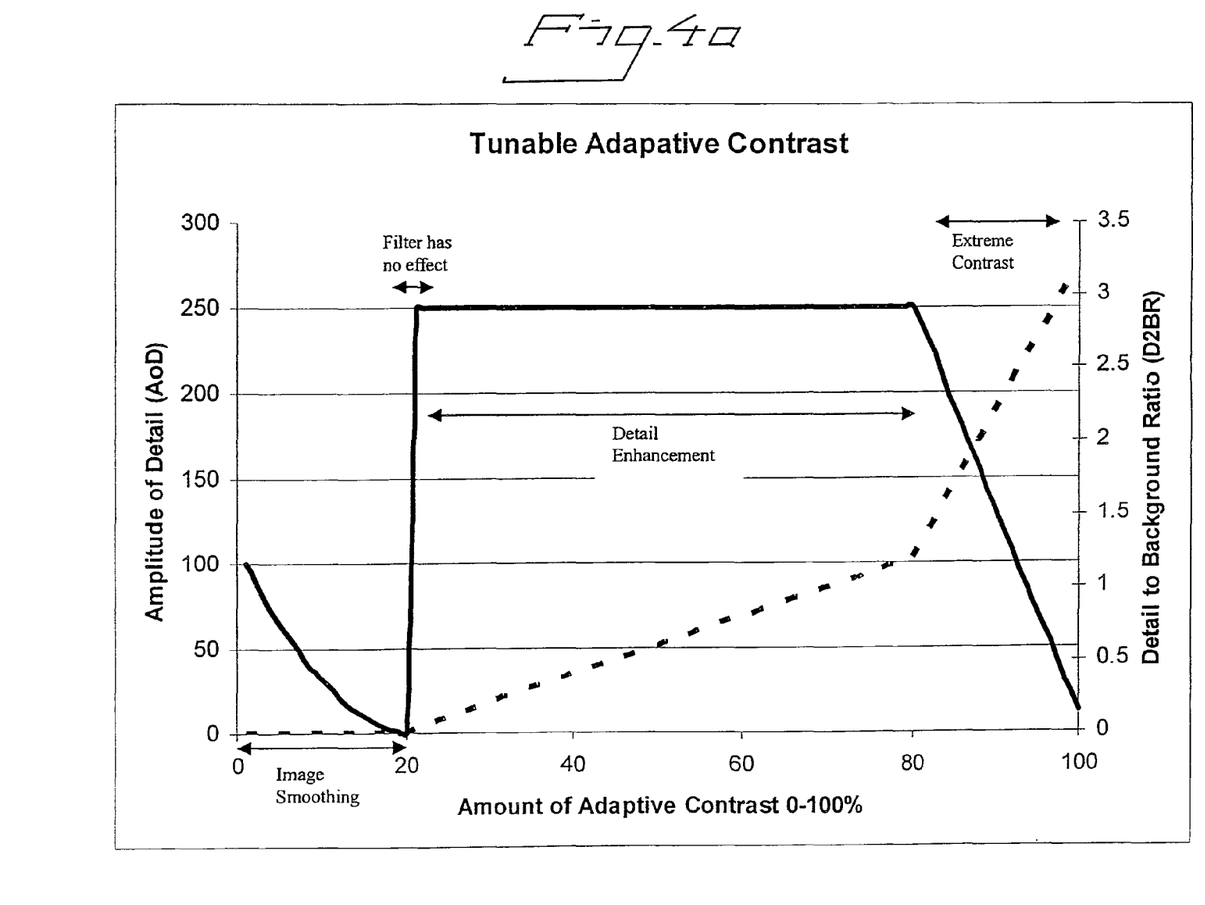
FIGS. 4a and 4b show graphical representations of parameter settings in accordance with an embodiment of the present invention.
Figure 4B:
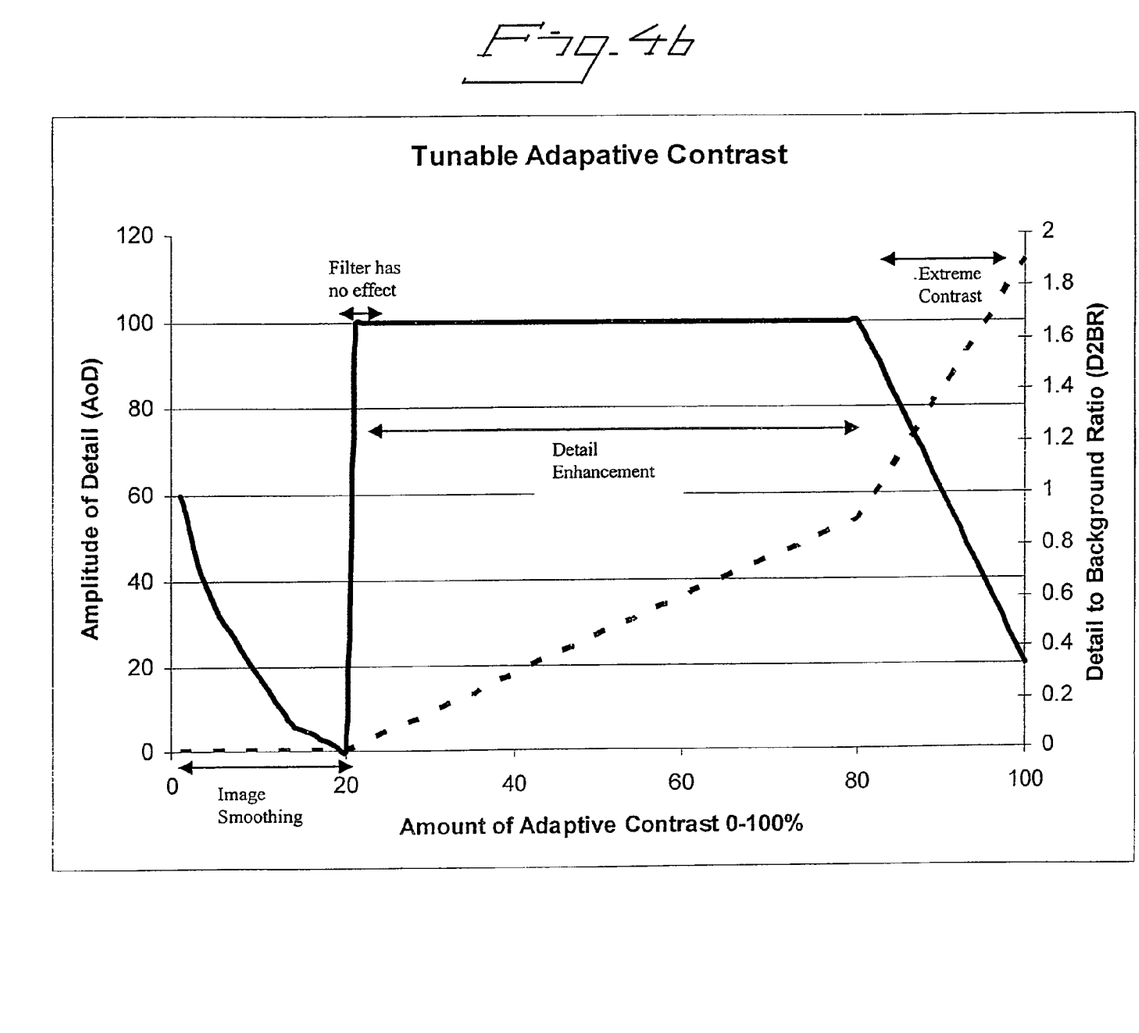

The stored AC table values may be adapted to range between two end values, such as 1 to 100, with corresponding values for the variable $\sigma_R$ and D2BR (e.g., $D_{Range}/B_{Range}$). For example, FIGS. 4a and 4b show embodiments of a graphical representation of how exemplary settings for the variable $\sigma_R$ and D2BR may vary as the AC input control (e.g., user input to control component 140 of FIG. 1) is manipulated to transition from one end point to another, such as scaled values 1 to 100 (or 0 to 100%), in a manner as previously discussed. Specifically, FIGS. 4a and 4b are plots of two exemplary tables of AC filtering algorithm values, with AC values along the x axis and corresponding values of the variable $\sigma_R$ plotted along the left y axis (labeled Definition of Detail and with values of digital units) and corresponding values of D2BR plotted along the right y axis (labeled Detail to Background Ratio).

The graphs of FIGS. 4a and 4b may be viewed as providing representative values (of the variable $\sigma_R$ and D2BR as the AC value is varied) for two different infrared sensors, respectively. For example, the graph of FIG. 4b may represent an infrared sensor having more noise and lower responsivity (e.g., resulting in a lower dynamic range) relative to the infrared sensor represented by the graph of FIG. 4a. Consequently, the values of the variable $\sigma_R$ and D2BR differ between FIGS. 4a and 4b as they are related to the dynamic range of the infrared sensor, with for example the limits of the variable $\sigma_R$ based on the noise floor (e.g., in digital units) and the dynamic range (e.g., ten percent or less of the dynamic range) of the particular infrared sensor.

As shown for example in FIG. 4a, very low AC values may provide noise reduction, such as for low contrast and high noise images, while very high AC values may provide extreme contrast, such as for a low contrast target in a high dynamic range scene. In general, for a typical image, a user may find the mid-range AC values to provide the most desirable image quality and may typically fine tune the AC value within this range.

Figure 6:
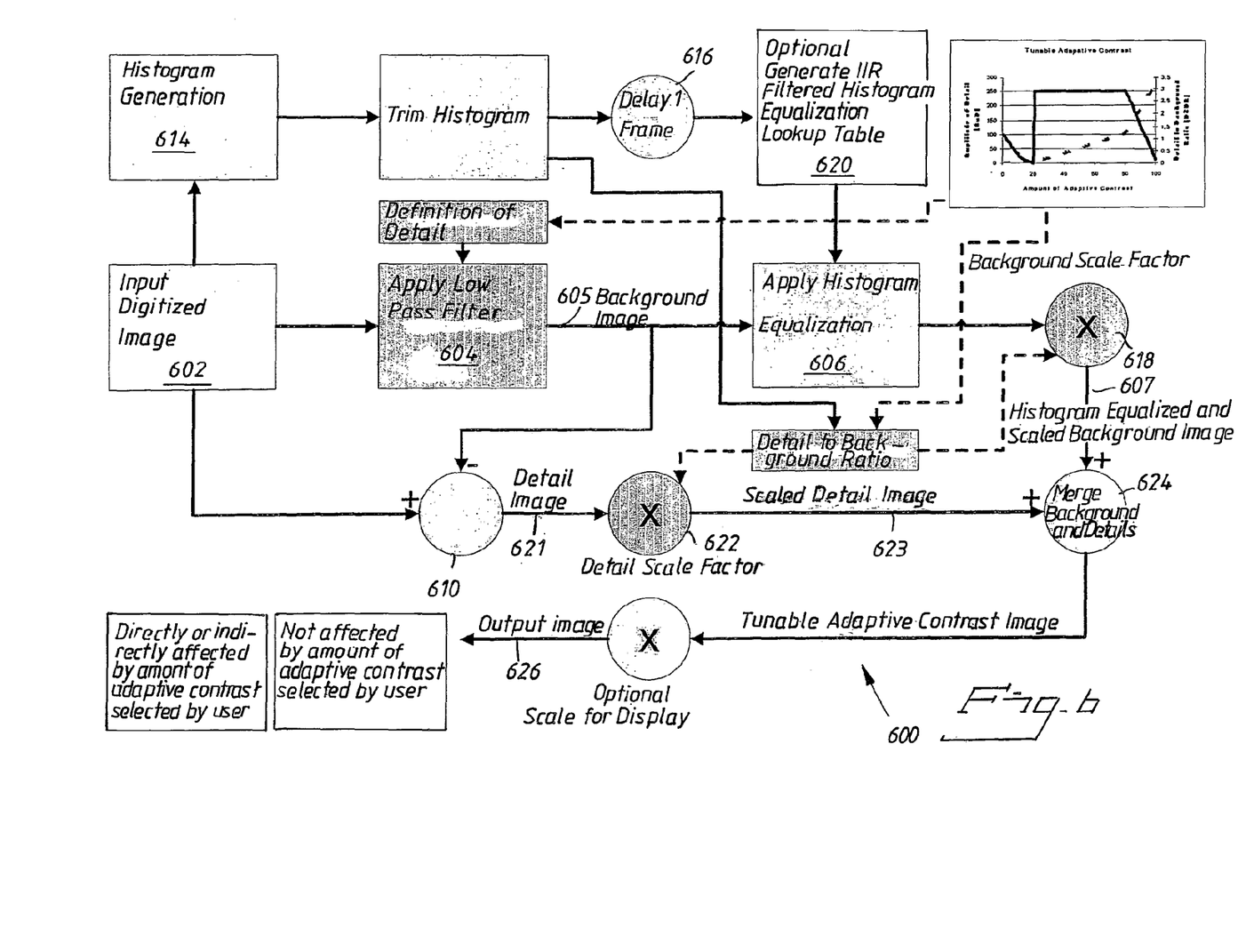
FIG. 6 shows a block diagram of a method for processing an image in accordance with an embodiment of the present invention.

FIG. 6 shows a block diagram 600 for processing an image in accordance with an embodiment of the present invention. For example, the operations illustrated in diagram 600 may represent exemplary operations for the AC algorithm that may be performed by image capturing system 100 (FIG. 1). A digitized signal 602 (e.g., an input frame of an infrared image signal from an infrared sensor) is provided and a low pass filtering operation 604 (e.g., a non linear Bilateral filtering operation) is performed on signal 602 and a histogram operation 614 (e.g., to generate a full dynamic range histogram) is performed on signal 602. Filtering operation 604 provides a background portion 605 by using the definition of detail corresponding to the AC value (e.g., provided by the user). When the Bilateral filter is used as the low pass filter AC chosen will define the details by setting the standard deviation of the parameter $\sigma_R$ in the Bilateral filter. This effectively defines a maximum amplitude of signals that become part of the detail image 621. As an example, the radiometric weights as a function of radiometric distance for this selected variable $\sigma_R$ may be stored in a lookup table (LUT) for reference (rather than calculating) by filtering operation 604.

Figure 7:
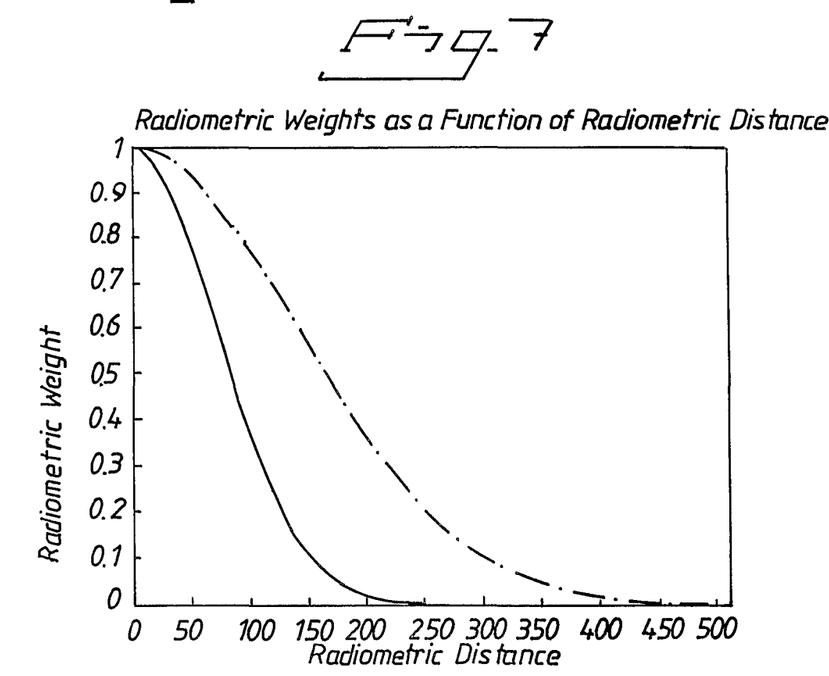
FIG. 7 shows a graphical representation of a variable for processing an image, such as with the method of FIG. 6, in accordance with an embodiment of the present invention.

For example, referring briefly to FIG. 7, a graph of radiometric weights as a function of radiometric distance is shown in accordance with an embodiment of the present invention for two exemplary values of the variable $\sigma_R$. Specifically, the graph illustrates how changing the settings for the variable $\sigma_R$ (e.g., low pass filter sigmaR parameter) will affect the radiometric weights, with the graph showing plots of two different values for the variable $\sigma_R$. The shape of the curve is the standard Gaussian as set forth below in equation (3), using the variable $\sigma_R$ (e.g., the standard deviation of the radiometric Gaussian) and where $D_R$ is the radiometric distance. A higher value for the variable $\sigma_R$ may generally result in greater smoothing and higher amplitude signals in the detail layer, while a lower value for the variable $\sigma_R$ may generally result in decreasing SNR in the detail image as the value decreases to the standard deviation of the noise.

$$e^{-\frac{D_R^2}{2\sigma_R^2}} \quad (3)$$

A processing operation 606 is performed on background portion 605 from filtering operation 604 by application of the histogram provided by histogram operation 614 to provide histogram equalization and output an equalized background portion 607. The histogram applied, for example, may be delayed by one frame by a delay element 616 and optionally processed 620, such as to ignore small outlying portions (e.g., 0.3% of the extreme tails of the histogram which may represent erroneous data). Specifically as an example for processing operation 606, a background LUT may be generated based on the histogram provided by histogram operation 614 and applied to background portion 605 (e.g., to translate the dynamic range of the background portion to the desired dynamic range) to provide the equalized background portion 607.

The background LUT may be modified via an operation 620 for processing operation 606 of the AC algorithm, such as for example to reduce drastic changes in the values of the background LUT (e.g., provide low pass temporal filtering, IIR) from one frame to the next. For example, operation 620 may form the background Histogram equalization LUT from a certain percentage (e.g., 90%) of the prior frame's IIR filtered LUT and a certain percentage (e.g., 10%) from the current frame's LUT.

The detail portion 621 (i.e., the second part or, detail image) is generated by subtracting (e.g., with a subtractor 610) the background portion 605 provided by filtering operation 604 from signal 602. The detail portion is then scaled (e.g., with a multiplier 622) based on the D2BR (Detail to Background Ratio) value, as discussed previously and with the D2BR value based on the corresponding AC value selected by the user, to provide a scaled detail portion 623. Equalized background portion 607 is added (e.g., with a summer 624) to scaled detail portion 623 to merge the data and provide an output frame 626 of image data. Assuming no scaling of the background portion within the Histogram Equalization step a separate scaling step 618 may be applied (e.g., using a multiplier) to match the dynamic range of the scaled detail portion. Optionally a final scaling step may be applied to the merged (summed) AC image to scale the signal to the desired output dynamic range (e.g., the dynamic range required by some video standard).

In general in accordance with an embodiment of the present invention, the AC algorithm (AC filter) may be implemented to split the image signal into two parts, with the first part containing the background (low pass) information and the second part containing the detail (finer) information of the image. The second part may be obtained simply by subtracting (e.g., high pass filter operation) the background information from the original image signal. The final output of the AC algorithm may be generated by scaling the detail information (or the background information) so that the detail information will be clearly visible in the resulting image regardless of the current dynamic range of that image As a further example, a low pass filter may be used to obtain the background information and may be designed such that it will not destroy sharp edges in the image. A linear low pass filter will by definition destroy edges because it computes a simple weighted mean of neighboring pixels even across sharp edges. Consequently, a bilateral filter may be used in the AC algorithm to dynamically calculate the weights of pixel neighbors based not only on proximity in location (close to the pixel being filtered) but also in radiometric proximity. Thus, neighbors with significantly higher or lower signal intensity than the pixel being filtered may be given zero or close to zero weight.

As another example, the AC algorithm may scale the background and detail information linearly to some desired predefined range. For example, a typical setting may divide the available output range (e.g., 256) into two approximately equal parts. For moderate dynamic range scenes and for sensors with fairly linear response (e.g., LWIR such as QWIP) this approach may be adequate. However, for scenes with large hot objects or detectors with a more non linear response (e.g., MWIR InSb detectors) this approach may not be adequate. For example, linearly mapping the high dynamic range of the background from a 14 to 8-bit domain may make hot objects white and the rest of the background a uniform grey, resulting in an unsatisfactory image quality. Alternatively in accordance with one or more embodiments, histogram equalization may be applied to the background information to provide a better distribution of the colors. For example, to preserve some of the radiometric properties of the image (e.g., it should still be evident that there exists a very hot object in the scene), a portion (e.g., 25%) of the designated background dynamic range may be preserved for a linear or log-linear mapping.

As another example, a LUT may be created in the histogram equalization operation of the AC filter and may include two parts, with one part being the standard LUT which scales range proportional to the number of pixels in that range and another part being a straight linear mapping. For example, typically 25 percent of the range reserved for the background will be mapped linearly, with the LUT that is calculated being used for the next frame. Additionally, a low pass filter may be applied to the LUT to dampen sudden changes in values.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into sub-components having software, hardware, and/or both without departing from the scope and functionality of the present disclosure. Where applicable, it is contemplated that software components may be implemented as hardware components and vice-versa.

Software, in accordance with the present disclosure, such as for example program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described herein illustrate but do not limit the invention. It should also be understood that numerous modifications and variations are possible in accordance with the principles of the present invention. Accordingly, the scope of the invention is defined only by the following claims.

The invention claimed is:

1. A method of processing an infrared image, the method comprising:
   capturing the infrared image;
   processing the infrared image to provide a background portion of the infrared image and a detail portion of the infrared image;
   scaling the background portion and/or the detail portion to provide a level of the detail portion relative to a level of the background portion;
   receiving a user operated control signal value from a user controlling two variables with a single control, wherein the processing and the scaling use filtering and gain values, respectively, corresponding to the control signal value;
   merging the background portion and the detail portion after the scaling to provide a processed infrared image, wherein the merging of the background and the detail portion is controlled by the two variables, wherein a first variable of the two variables represents a standard deviation of the radiometric Gaussian, and wherein a second variable of the two variables represents a ratio between a dynamic range of the detail portion and a dynamic range of the background portion; and
   storing or displaying the processed infrared image.

2. The method according to claim 1, further comprising: performing histogram equalization to the background portion prior to the merging of the background portion and the detail portion.

3. The method according to claim 2, wherein processing the infrared image comprises:
   filtering the infrared image to provide the background portion; and
   subtracting the background portion from the infrared image to provide the detail portion.

4. The method according to claim 3, wherein the filtering applies a bilateral filter to the infrared image, and wherein the bilateral filter uses a filter parameter corresponding to the user operated control signal value.

5. The method according to claim 4, further comprising:
   storing a table of values of radiometric weights as a function of radiometric distance for the filter parameter for use by the filtering.

6. The method according to claim 1, wherein the scaling is applied only to the detail portion to provide a level of the detail portion relative to a level of the background portion.

7. The method according to claim 6, wherein the scaling to provide a level of the detail portion relative to a level of the background portion is based on a gain ratio corresponding to the user operated control value.

8. An infrared image capturing system, comprising:
   an infrared detector configured to capture an infrared image;
   a processor;
   a display;
   a single control configured to control both of two variables; and
   a memory structure configured to store information to control the processor to perform infrared image processing comprising:
   processing the infrared image to provide a background portion of the infrared image and a detail portion of the infrared image;
   scaling the background portion and/or the detail portion to provide a level of the detail portion relative to a level of the background portion;
   receiving a user operated control signal value from a user controlling the two variables with the single control, wherein the processing and the scaling use filtering and gain values, respectively, corresponding to the control signal value;
   merging the background portion and the detail portion after the scaling to provide a processed infrared image, wherein the merging of the background and the detail portion is controlled by the two variables, wherein a first variable of the two variables represents a standard deviation of the radiometric Gaussian, and wherein a second variable of the two variables represents a ratio between a dynamic range of the detail portion and a dynamic range of the background portion;
   storing or displaying the processed infrared image; and
   wherein the display is configured to display the processed infrared image.

9. The infrared image capturing system according to claim 8, further comprising:
   a sensor configured to provide environmental information to the processing component.

10. The infrared image capturing system according to claim 8, wherein the infrared image processing performed by the processor further comprises performing histogram equalization to the background portion prior to the merging of the background portion and the detail portion.

11. The infrared image capturing system according to claim 10, wherein the processing of the infrared image comprises:
    filtering the infrared image to provide the background portion; and
    subtracting the background portion from the infrared image to provide the detail portion.

12. The infrared image capturing system according to claim 11, wherein the filtering of the infrared image comprises applying a bilateral filter to the infrared image, and wherein the bilateral filter uses a filter parameter corresponding to the user operated control signal value.

13. The infrared image capturing system according to claim 12, wherein the infrared image processing performed by the processor further comprises:
    storing a table of values of radiometric weights as a function of radiometric distance for the filter parameter for use by the filtering.

14. The infrared image capturing system according to claim 8, wherein the scaling is applied only to the detail portion to provide a level of the detail portion relative to a level of the background portion.

15. The infrared image capturing system according to claim 14, wherein the scaling is based on a gain ratio corresponding to the user operated control signal value.

16. A computer program product of processing an infrared image, comprising:
    a non-transitory computer-readable medium,
    computer program instructions recorded on the computer readable medium and executable by a processor for performing a method comprising:
    capturing the infrared image;
    processing the infrared image to provide a background portion of the infrared image and a detail portion of the infrared image;
    scaling the background portion and/or the detail portion to provide a level of the detail portion relative to a level of the background portion;
    receiving a user operated control signal value from a user controlling two variables with a single control, wherein the processing and the scaling use filtering and gain values, respectively, corresponding to the control signal value;
    merging the background portion and the detail portion after the scaling to provide a processed infrared image, wherein the merging of the background and the detail portion is controlled by the two variables, wherein a first variable represents a standard deviation of the radiometric Gaussian, and wherein a second variable represents the ratio between the dynamic range of the detailed portion and the dynamic range of the background portion; and
    storing or displaying the processed infrared image.

17. The computer program product according to claim 16, wherein the processing of the infrared image comprises:
    filtering infrared image to provide the background portion; and
    subtracting the background portion from the infrared image to provide the detail portion.

18. The computer program product according to claim 16, wherein the method further comprises:
    performing histogram equalization to the background portion prior to the merging of the background portion and the detail portion.

19. The computer program product according to claim 18, wherein the filtering of the infrared image comprises applying a bilateral filter to the infrared image, and wherein the bilateral filter uses a filter parameter corresponding to the user operated control signal value.

20. The computer program product according to claim 19, wherein the method further comprises:
storing a table of values of radiometric weights as a function of radiometric distance for the filter parameter for use by the filtering.

21. The computer program product according to claim 16, wherein the scaling is applied, only to the detail portion to provide a level of the detail portion relative to a level of the background portion.

22. The computer program product according to claim 21, wherein the scaling is based on a gain ratio corresponding to the user operated control signal value.

* * * * *